United States Patent
Babcock

(10) Patent No.: US 7,530,057 B2
(45) Date of Patent: May 5, 2009

(54) PROGRAM CODE COVERAGE

(75) Inventor: David J. Babcock, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 10/971,267

(22) Filed: Oct. 21, 2004

(65) Prior Publication Data

US 2006/0101419 A1 May 11, 2006

(51) Int. Cl.
G06F 9/44 (2006.01)
G06F 9/45 (2006.01)
G06F 11/00 (2006.01)

(52) U.S. Cl. .................. 717/129; 717/126; 717/130; 717/158; 714/34

(58) Field of Classification Search ......... 717/126–132, 717/158; 714/34
See application file for complete search history.

(56) References Cited

U.S. PATENT DOCUMENTS

| | | | | |
|---|---|---|---|---|
| 5,758,061 A | * | 5/1998 | Plum | 714/35 |
| 5,933,640 A | * | 8/1999 | Dion | 717/132 |
| 6,192,511 B1 | * | 2/2001 | Johnston et al. | 717/109 |
| 6,701,518 B1 | * | 3/2004 | Dwyer et al. | 717/126 |
| 6,957,421 B2 | * | 10/2005 | Hundt et al. | 717/130 |
| 6,966,057 B2 | * | 11/2005 | Lueh | 717/158 |
| 6,968,546 B2 | * | 11/2005 | Lueh | 717/158 |
| 2002/0104074 A1 | * | 8/2002 | Hundt et al. | 717/129 |
| 2002/0152455 A1 | * | 10/2002 | Hundt et al. | 717/131 |
| 2003/0093716 A1 | * | 5/2003 | Farchi et al. | 714/34 |

\* cited by examiner

*Primary Examiner*—Lewis A Bullock, Jr.
*Assistant Examiner*—Jennifer N To

(57) ABSTRACT

Determining code coverage of a computer program is disclosed. In an embodiment, the program is divided into a plurality of code sections, and the program including the plurality of code sections is run with a plurality of test data sets. In the first test run, all code sections of the plurality of code sections are instrumented, and in each of a current test run other than the first test run, only those code sections that were not executed in any one of the test runs prior to the current test run are instrumented. A code section being executed in any of one of the test runs of the plurality of test runs is considered covered by the test runs. Additionally, within the current test run, the code coverage measurement is only done on the first execution of a code section.

12 Claims, 4 Drawing Sheets

|  | A<br>Instrumentation -<br>Insert NO-OP ME | B<br>Change NO-OP<br>ME to No-OP or<br>Equivalences | C<br>Execute NO-OP<br>or Equivalences |
|---|---|---|---|
| 410 | Break | Original Instruction | Execute Original Instruction |
| 420 | Stz * | Opcode 0 | Execute No-op |
| 430 | Mov *, no-op | No-op | Execute No-op |
| 440 | b * +1<br>ai * -1, 1 | b * +2<br>ai * -1, 1 | b * +2<br>[ai * -1, 1]<br>Branch to this line when (b * +2) is reached |
| 450 | label:   spill R1<br>         load R1, branch<br>         store R1, label<br>         restore R1<br>branch: b branch + 1 | label:   b branch +1<br>         load R1, branch<br>         store R1, label<br>         restore R1<br>branch: b branch + 1 | label: b branch + 1<br>      [load R1, branch]<br>      [store R1, label]<br>      [restore R1]<br>branch: [b branch + 1]<br>      Branch to this line when (b branch + 1) is reached |
| 460 | patch:  b no-op-me | No-op | Execute No-op |

For use by 460    no-op-me:  spill R1
                                       load R1, no-op
                                       store R1, patch
                                       restore R1
                                       b patch + 1
                no-op:  no-op

FIG. 4

Note: instructions in [ ] are skipped

PROGRAM CODE COVERAGE

FIELD OF THE INVENTION

The present invention relates generally to code coverage of computer programs.

BACKGROUND OF THE INVENTION

A common software development and/or release task is to determine what portions of the software code have been or have not been executed when the code is run with various test data sets. This measurement is generally termed "code coverage." Typically, the program being measured is run many times, each time with a different test data set, and the results are combined into a single report as an "aggregated code coverage." Many companies have a release criteria that a percentage (e.g., 90%, 95%, 98%, etc.) of the code has been exercised by the test data sets which serves as one measurement of quality. This is because the higher the percentage of the code coverage, the higher the confidence that the program has been thoroughly tested and will execute correctly.

There are many approaches to measuring the code coverage of a single run, but they usually suffer the same performance disadvantage especially when aggregated code coverage is done. In those approaches, the code coverage is measured independently and redundantly for each test run. After each run, or, in some cases, after all runs, the results are combined and duplicate code coverage information is discarded. Since most test runs exercise much of the same code with only a little variation from run to run, the performance overhead to capture all of the commonly-executed code coverage information is wasted. Even within a single run, the same code may be repeatedly executed thousands of times. Any added instructions to measure code coverage will likewise be executed thousands of times. After the first execution, subsequent executions are wasted effort.

There are many "types" of code coverage measurements: function, basic block, statement, condition, etc. However, the most common and useful measurement is basic block. A basic block of programming code is a sequence of instructions in which there is only one entrance (the first instruction) and one exit (the last instruction). If one instruction in a basic block is executed, then all instructions in that basic block will be executed. For example, in the statement: if (condition) then {A} else {B}, each of A and B is a basic block. Additional examples are the code in a loop, straight-line code with no control changes, etc.

SUMMARY OF THE INVENTION

The present invention relates to determining code coverage of a computer program. In an embodiment, the program being measured is divided into a plurality of code sections, and the program including the plurality of code sections is run with a plurality of test data sets. In the first test run, all code sections of the plurality of code sections are instrumented, and in each test run (the current test run) other than the first test run, only those code sections that were not executed in any one of the test runs prior to the current test run are instrumented. A code section being executed in any of one of the test runs of the plurality of test runs is considered covered by the test runs. In this embodiment, code section relates to a function, a basic block, a source statement, a condition test, and/or any other code coverage types. Additionally, within the current test run, the code coverage measurement is only done on the first execution of a code section.

BRIEF DESCRIPTION OF THE DRAWINGS

The present invention is illustrated by way of example, and not by way of limitation, in the figures of the accompanying drawings in which like reference numerals refer to similar elements and in which:

FIG. 4 is used to illustrate embodiments of NO-OP ME instructions.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
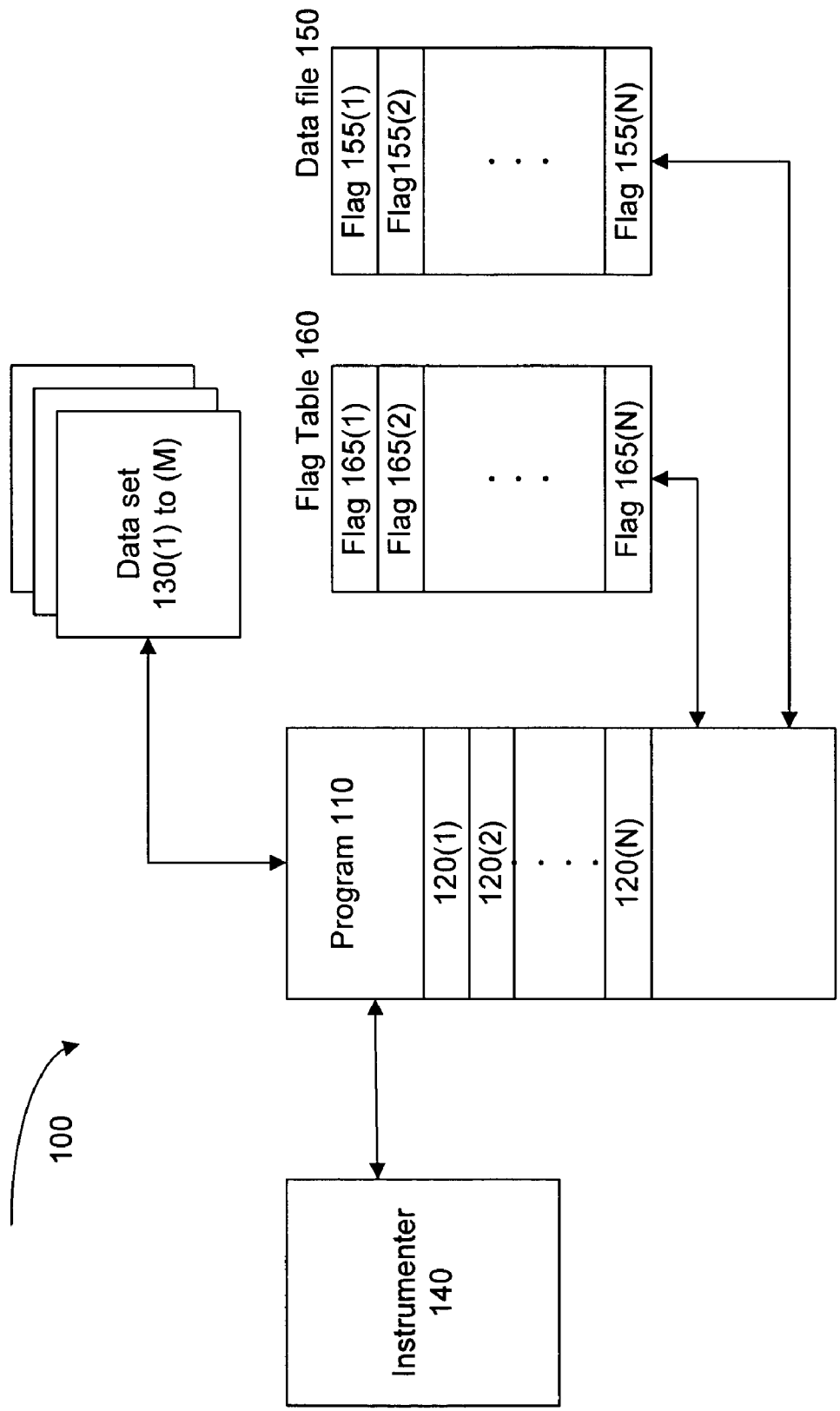
FIG. 1 shows an arrangement in accordance with an embodiment.

Skipping Instrumentation for Code Sections that were Executed in Test Runs Other than the First Run Overview FIG. 1 shows an arrangement 100 in accordance with an embodiment of the invention. Program 110 includes a plurality of code sections 120, e.g., code section 120(1) to 120(N). A code section 120 may be an instruction, a statement, a basic block, a function, etc. At the end of all test runs, knowing the code coverage of the code sections 120 is desirable.

Program 110 is tested with a plurality of test data sets 130, e.g., 130(1) to 130(M). Generally, a data set is selected and/or designed such that some particular code sections 120 may be executed and thus tested. In an embodiment, the original code of program 110 is run for each test run.

Instrumenter 140 modifies the binary code of program 110 while it is running. Generally, instrumenter 140 instruments, e.g., modifies and/or adds instructions into program 110, to measure the code coverage of program 110. However, for the first test run, e.g., a test run with data set 130(1), instrumenter 140 instruments all code sections 120, and, for each subsequent test run, instrumenter 140 instruments only code sections 120 that have not been executed in previous test runs. Alternatively speaking, instrumenter 140 does not instrument code sections 120 that were executed at least once in previous test runs. Whether a code section 120 has been executed at least once in previous test runs is based on flags 165 that are read from data file 150 into flag table 160 at the beginning of a test run. With respect to a current test run, if a flag 165 corresponding to a code section 120 has a value "true," then that code section 120 was executed at least once in test runs prior to the current test run. Conversely, if that flag 165 has a value "false," then the corresponding code section 120 was never executed in the previous test runs. The value true or false for flags 165 and 155 is used for illustration purposes only. Other values indicating whether a code section has/has not been executed are within scope of embodiments of the invention.

In an embodiment, the instruction to measure the code coverage is a statement or set of statements to indicate whether a code section 120 is executed or not, and this information is aggregated to determine the number of code sections 120 and/or the percentage of the code sections 120 that have been executed at least once through all the test runs. Further, at the time of instrumentation for a code section 120, e.g., when the corresponding flag 165 is a false and the code section 120 is examined, instrumenter 140 replaces an instruction in the code section 120 with a predetermined instruction, such as a "break" instruction. Subsequently, when this code section 120 is invoked, this break instruction is reached, instrumenter 140 restores the instruction by replacing this break instruction with the saved instruction. Using a break instruction to indicate whether a code section 120 has been executed in a test run reflects an implementation of the invention. However, the invention is not limited to this method, any other mechanism using a replaceable instruction indicating whether a code section 120 has been executed is within the scope of embodiments of the invention.

Data file 150 stores flags 155 corresponding to each code section 120 after each test run. If there are N code sections 120, then there are N flags 155, each corresponding to a code section 120. At the beginning of a test run, the flag data in data file 150 is read into flag table 160, and at the end of a test run, the flag data in table 160 is written to data file 150. If a flag, e.g., 155(I), e.g., has a value false, then the corresponding code section, e.g., section 120(I), was never executed in any of the test runs. However, if the flag 155(I) has a value true, then the corresponding code section 120(I) was executed at least once in the previous test runs. Because the value "true" in data file 150 is aggregated from each test run, the number of flags 155 having a "true" value generally increases after each test run. Further, once a flag 155 becomes true, it does not turn to false. The higher the number of flags 155 having a value true, the more code sections 120 were executed at least once during the test runs with the data sets 130, and the better confidence that program 110 will execute correctly. If there are N code sections 120 and L flags 155 with a value true, then the aggregate percentage code coverage may be determined as L/N.

Flag table 160 stores flags 165 corresponding to each code section 120 during a test run. If there are N code sections 120, then there are N flags 165, each corresponding to a code section 120. Because the number of flags 155 and 165 correspond to the number of code sections 120, the number of flags 155 and 165 are the same. That is, there are N flags for each set of flags 155 and 165, for N code sections 120. At the beginning of a test run, the flag data from data file 150 is read into flag table 160. During a test run a flag, e.g., flag 165(I), is changed from false to true if the corresponding code section, e.g., section 120(I), is executed. In the embodiment that a "break" instruction is inserted in a code section 120 at the time of instrumentation, executing the code section and thus reaching the break instruction causes the corresponding flag 165 to be set to a value true. At the end of each test run, the flag data in flag table 160 is written to data file 150.

Method Embodiment

Figure 2:
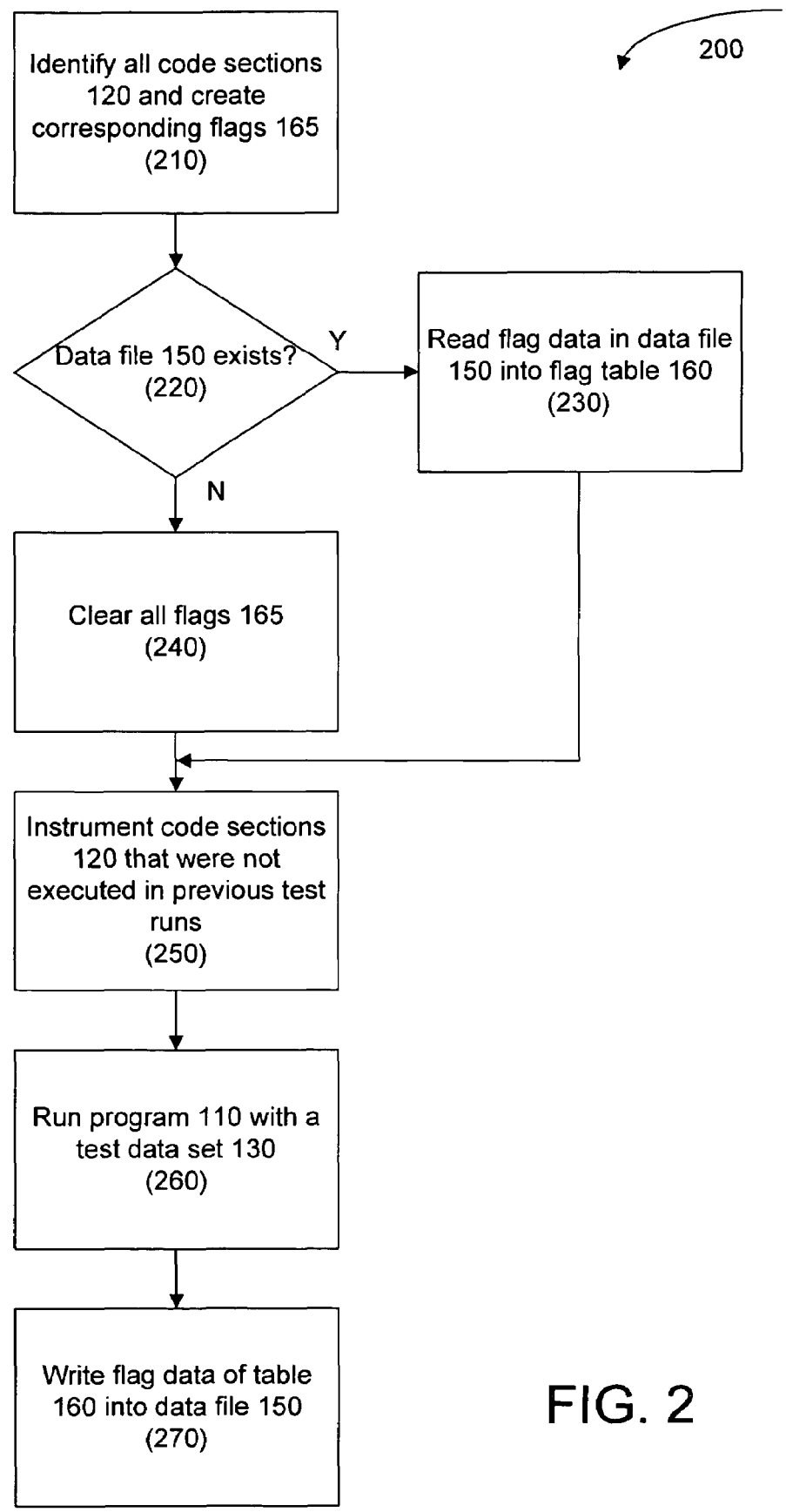
FIG. 2 shows a flowchart illustrating a test run, in accordance with an embodiment.

FIG. 2 shows a flowchart 200 illustrating a test run, in accordance with an embodiment of the invention. In block 210, all code sections 120 of program 110 are identified and corresponding flags 165 are created, that is, storage for the N flags is allocated within program 110's memory. Generally, a piece of code looping through the instructions of program 110 achieves this task.

In block 220, it is determined whether data file 150 exists. If data file 150 does not exist, then this is the first test run, e.g., program 110 is run with data set 130(1), and, in block 240, all flags 165 are cleared, e.g., set to false.

However, if data file 150 exists, then at least one test run has been previously performed, and the flag data in data file 150 is read into table 160 in block 230. That is, the data for flags 165 are replaced by the data for flags 155.

In block 250, code sections 120 corresponding to flags 165 with a value false are instrumented. That is, in an embodiment, instrumenter 140 replaces an instruction in each code section 120 that corresponds to a flag 165 having a value false with a "break" instruction. As explained above, with respect to a current test run, code sections 120 that correspond to flags 165 with the false value were not executed in any test run prior to the current test run. Those skilled in the art will recognize that, for the first test run, all flags 165 are false, and instrumenter 140 instruments all code sections 120.

In block 260, program 110 is run with a data set 130. During this test run, the value of flags 165 changes as appropriate. That is, if a code section 120 is invoked, then the corresponding break instruction is reached, the replaced instruction is restored; the corresponding flag 165 is changed from false to true, and from then on the code section 120 runs as normal for the rest of the current run.

In block 270, once the test run finishes, the flag data of table 160 is written into data file 150. That is, the value of flags 155 in data file 150 is replaced with the value of flags 165 in table 160.

The above method embodiment is used for all test runs, with test data sets 130(1) to 130(M). After each test run, the number of flags 155 in data file 150 that has a value true generally increases. As a result, in subsequent runs, a fewer number of code sections 120 are instrumented and a fewer number of additional instructions in code sections 120 are executed. Therefore, program 110 runs faster with each successive run.

Skipping Instrumented Instructions within a Test Run Overview

In this document, the term "instruction" is referred to as singular. However, embodiments of the invention are also applicable, when more than one instruction is involved, such as when more than one instruction is instrumented; the NO-OP (no operation) equivalence and/or the NO-OP ME instruction includes more than one instruction, etc. In various embodiments of the invention, within a test run, the instruction instrumented to measure the code coverage is executed only the first time, and subsequent executions of the same instruction are skipped. In an embodiment, the instruction instrumented to measure the code coverage is also the indicator for whether a code section 120 has been executed. For illustration purposes, this instruction is referred to as the instrumented instruction Depending on the instruction set of a particular computer, various embodiments of the invention achieve the same goal of skipping the instrumented instruction by various implementations. Generally, the instrumented instruction, after being executed the first time, is replaced with a NO-OP instruction or an instruction comparable to the NO-OP instruction, which, as those skilled in the art will recognize, includes an op-code that does nothing and disappears inside the instruction execution pipeline. As a result, the instrumented instruction may be referred to as a NO-OP ME instruction, e.g., replace "me," or "the instrumented instruction" with a NO-OP instruction. For illustration purposes, this document refers to NO-OP instructions, but NO-OP compatibles or equivalences are also applicable. At the time of instrumentation, e.g., when a code section 120 is examined and the corresponding flag 165 has a value false, instrumenter 140 inserts a NO-OP ME instruction in the code section 120. Within a test run, when the code section 120 is executed the first time, the NO-OP ME instruction is executed, which, in effect, changes that NO-OP ME instruction to a NO-OP instruction. Because the instrumented instruction is replaced with a NO-OP instruction after the first execution, executing the instrumented instruction subsequent to the first execution is in fact executing the NO-OP instruction. Further, because executing a NO-OP instruction does not cost instruction execution time, executing the instrumented instruction that has been replaced by a NO-OP instruction may be considered as skipping the instrumented instruction.

Once the test run is complete, embodiments of the invention scan through all code sections 120 corresponding to flags 165 with a value of false and examine the NO-OP ME instruction to determine whether a code section 120 was executed at least once. For a particular code section 120, if the NO-OP ME instruction remains intact, then that code section 120 was not invoked or executed. As a result, the corresponding flag 165 remains the same, e.g., having the same false value. However, if the NO-OP ME instruction was transformed into a NO-OP instruction, then that code section 120 was invoked and executed at least once. As a result, embodiments of the invention change the corresponding flag 165 from a value false to a true.

Inserting the NO-OP ME instruction at the beginning of a code section 120 reflects an embodiment of the invention. However, the invention is not limited to the beginning of a code section 120; any other location reflecting that the corresponding code section 120 has been executed is within the scope of embodiments of the invention.

Method Embodiment

Figure 3:
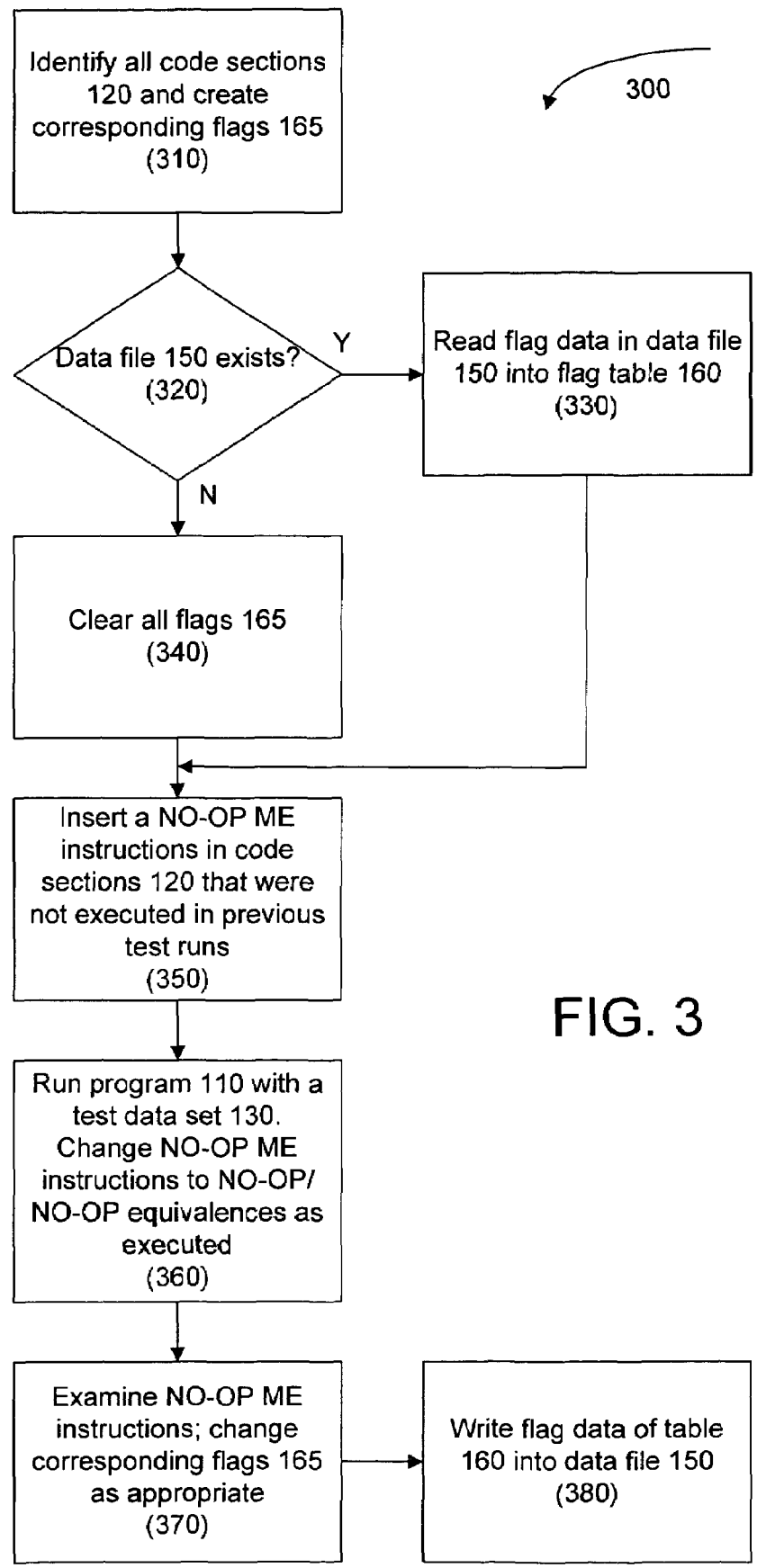
FIG. 3 shows a flowchart illustrating that, within a test run, instrumented instructions are skipped in executions subsequent to the first execution, in accordance with an embodiment.

FIG. 3 is a flowchart 300 illustrating a method embodiment that, within a test run, skips the instrumented instruction in executions subsequent to the first execution.

Blocks 310, 320, 330, and 340 are the same as blocks 210, 220, 230 and 240 in FIG. 2, respectively. That is, after block 340, if program 110 is run the first time, then all flags 165 are cleared (e.g., set to false), and if the test run is that other than the first run, then all flags 165 have the same value as those of flags 155.

In block 350, for all code sections 120 corresponding to flags 165 with a value false, instrumenter 140 inserts a NOP-ME instruction in the code section 120.

In block 360, program 110 is run with a data set 130. As program 110 is executed, if a code section 120 corresponding to a flag 165 with a false value is invoked the first time, then the NO-OP ME instruction in that code section 120 is changed to a NO-OP instruction. Within the same test run and in subsequent invocations to the same code section 120, the NO-OP instruction is reached and thus executed. In effect, the instrumented instruction or the NO-OP ME instruction is skipped.

In block 370, all code sections 120 corresponding to flags 165 with a value false are examined. If the NO-OP ME instruction in a code section 120 remains the same, then that code section 120 was not executed during this test run, and the corresponding flag 165 remains the same value false. However, if the NO-OP ME instruction of a code section 120 has been transformed into a NO-OP instruction, then that code section 120 was executed at least once in this test run. Consequently, the corresponding flag 165 is changed from a value false to true.

In block 380, the data flags of table 160 are written into data file 150 in which the value of flags 155 in data file 150 are replaced with the value of flags 165 in table 160.

Examples of NO-OP ME Instructions

FIG. 4 is used to illustrate embodiments of NO-OP ME instructions for different computer instruction sets. Column "A" indicates the NO-OP ME instruction which is inserted at the time of instrumentation. Column "B" indicates that, for the first execution within a test run the NO-OP ME instruction is replaced with a NO-OP instruction, and column "C" indicate that for execution subsequent to the first execution, the NO-OP instruction is executed, or the NO-OP ME instruction is skipped. A "*" indicates the location of the instruction being executed.

In embodiment 410, the "break" instruction is replaced with the original instruction at that location. This is the example previously described.

In embodiment 420, the "STZ *" instruction, when executed, stores a zero and thus constitutes an op-code zero at the location "*" or the location of the "STZ *" instruction itself. This is used in the embodiment for computers where an op-code 0 is equivalent to a NO-OP instruction. In executions subsequent to the first execution, the op-code 0 instruction is executed in place of the instrumented instruction "STZ *".

In embodiment 430, the "MOV *, NOP" instruction, when executed, moves a NO-OP instruction to the location "*" or the location of the "MOV *, NOP" instruction itself. In executions subsequent to the first execution, the NO-OP instruction is executed in place of the instrumented instruction "MOV *, NOP".

In embodiment 440, the "b *+1" instruction, when executed, branches to the location *+1, which is the next instruction. The next instruction modifies the previous instruction by adding 1 to it, changing it to a "b *+2" instruction. In executions subsequent to the first execution, when the instruction (b *+2) is reached, execution is directed around the "ai *−1, 1" instruction and the instrumented instructions are effectively skipped.

In embodiment 450 more instructions are needed to replace the "NO-OP ME" with a NO-OP equivalence. When executed, the example instructions replace the "Spill R1" instruction at label with a "b branch+1" instruction. In subsequent executions, when the instruction "b branch+1" is reached, execution skips over the instrumented instructions.

In embodiments 460, the instructions which implement the "NO-OP ME" function are not located "inline," that is immediately within code section 120, but in another location in program 110's memory. This is sometimes referred to as "out-to-the-woods-and-back" code and is done to improve execution performance. At the first execution, the "b no-op me" instruction transfers execution to the code labeled no-op-me, which replaces the "b no-op-me" instruction with a "NO-OP" instruction and then transfer execution back to the continuation of code section 120, the instrumented instructions are transformed into a NO-OP instruction, which is executed in executions subsequent to the first execution and, effectively, the instrumented instructions are skipped.

Embodiments of the invention are advantageous over other approaches because, with respect to a current test run, those code sections 120 that were executed at least once in any one of the previous runs are not instrumented, and these code sections 120 are therefore executed with the original code rather than the instrumented code like other approaches. Executing the original code of a code section 120 is faster than executing the instrumented code of the same code section 120 because the instrumented code section would include the code to measure the code coverage. Embodiments of the invention that skip the instrumented instructions in executions subsequent to the first execution are also advantageous because skipping execution of the instrumented instructions also allow the program to run faster in the current test run.

A computer may be used to run program 110, to perform embodiments in accordance with the techniques described above. For example, a CPU (Central Processing Unit) of the computer executes program instructions implementing the method embodiments by loading the program from a CD-ROM to RAM and executes those instructions from RAM. The program may be software, firmware, or a combination of software and firmware. In alternative embodiments, hardwire circuitry may be used in place of or in combination with program instructions to implement the described techniques. Consequently, embodiments of the invention are not limited to any one or a combination of software, firmware, hardware, or circuitry.

Instructions executed by the computer may be stored in and/or carried through one or more computer readable-media from which a computer reads information. Computer-readable media may be magnetic medium such as, a floppy disk, a hard disk, a zip-drive cartridge, etc.; optical medium such as a CD-ROM, a CD-RAM, etc.; memory chips, such as RAM, ROM, EPROM, EEPROM, etc. Computer-readable media may also be coaxial cables, copper wire, fiber optics, acoustic, electromagnetic waves, capacitive or inductive coupling, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for determining code coverage of a computer program, comprising:
    providing a plurality of code sections in the program;
    applying a plurality of test runs to the program including the plurality of code sections;
    wherein
        in a first test run of the plurality of test runs, instrumenting all code sections of the plurality of code sections by inserting a first test instruction in each of the code sections;
        in the first test run, after executing any particular one of the instrumented code sections, replacing the first test instruction in the particular instrumented code section with a second test instruction, wherein the second test instruction comprises an instruction selected from a group consisting of a no operation instruction and a no operation equivalent instruction, and wherein the first test instruction comprises an instruction to replace the first test instruction with the instruction selected from the group consisting of a no operation instruction and a no operation equivalent instruction;
        in a current test run after the first test run, instrumenting only those code sections that were not executed in any one of the test runs prior to the current test run;
        a code section being executed in any of one of the test runs of the plurality of test runs is considered covered by the plurality of test runs.

2. The method of claim 1 wherein data indicating whether a code section is executed in a test run is saved for use in a subsequent test run.

3. The method of claim 1 wherein a code section is associated with a piece of data indicating whether that code section is executed in a test run, and this piece of data is saved for use in a subsequent test run.

4. The method of claim 1 wherein:
    reaching the first test instruction in the particular one of the code sections indicates that the particular code section is executed in a particular test run.

5. The method of claim 1 wherein:
    the plurality of code sections correspond to a plurality of pieces of data, each piece of data is associated with a code section and indicates whether that code section is executed in a test run, and
    saving the plurality of pieces of data after the first test run indicates the first test run is performed.

6. The method of claim 1 wherein:
    within the current test run, executing the first test instruction in any instrumented code section only one time.

7. The method of claim 1, further comprising:
    determining that the particular one of the code sections has been executed by finding the second test instruction instead of the first test instruction in the particular code section.

8. The method of claim 7, further comprising:
    determining that a given one of the code sections was not executed by finding the first test instruction in the given code section.

9. The method of claim 1, further comprising:
    in the current test run, for those code sections that were run in any one of the test runs prior to the current test run, executing the code sections containing the second test instruction rather than code sections containing the first test instruction.

10. A computer-readable storage medium embodying program instructions that when executed by a computer performs a method for determining code coverage of a program, the method comprising:
    corresponding a flag of a plurality of first flags to a code section of a plurality of code sections of the program;
    instrumenting the code sections based on the values of the plurality of first flags, wherein instrumenting the code sections comprises inserting a first test instruction in each of the instrumented code sections;
    in a test run of the program, upon executing the first test instruction in any particular one of the instrumented code sections, replacing the first test instruction with a second test instruction in the particular instrumented code section, wherein the second test instruction comprises an instruction selected from a group consisting of a no operation instruction and a no operation equivalent instruction, and wherein the first test instruction comprises an instruction to replace the first test instruction with the instruction selected from the group consisting of a no operation instruction and a no operation equivalent instruction.

11. The computer-readable storage medium of claim 10, wherein the method further comprises:
    determining that a given one of the code sections has been executed by finding the second test instruction instead of the first test instruction in the given code section.

12. The computer-readable storage medium of claim 11, wherein the method further comprises:
    determining that the given one of the code sections was not executed by finding the first test instruction in the given code section.

* * * * *